(12) United States Patent
Jeong

(10) Patent No.: US 7,277,256 B2
(45) Date of Patent: Oct. 2, 2007

(54) ACTUATOR AND HARD DISK DRIVE EMPLOYING THE SAME

(75) Inventor: Ki-tag Jeong, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 279 days.

(21) Appl. No.: 10/617,171

(22) Filed: Jul. 11, 2003

(65) Prior Publication Data

US 2004/0012892 A1   Jan. 22, 2004

(30) Foreign Application Priority Data

Jul. 16, 2002  (KR) .............................. 2002-41586

(51) Int. Cl.
*G11B 21/08* (2006.01)
*H02K 41/00* (2006.01)

(52) U.S. Cl. ............................................... 360/264.7

(58) Field of Classification Search .............. 360/264.7, 360/264.8, 265, 264.2, 265.1, 265.6; 310/12
See application file for complete search history.

(56) References Cited

U.S. PATENT DOCUMENTS

| | | |
|---|---|---|
| 5,382,851 A | 1/1995 | Loubier |
| 5,528,091 A | 6/1996 | Loubier et al. |
| 5,627,701 A | 5/1997 | Misso et al. |
| 5,875,073 A * | 2/1999 | Andrews et al. ......... 360/265.1 |
| 5,894,382 A * | 4/1999 | Hyde ...................... 360/265.6 |
| 5,991,123 A * | 11/1999 | Casey ...................... 360/264.2 |

(Continued)

FOREIGN PATENT DOCUMENTS

EP        576 839        1/1994

(Continued)

OTHER PUBLICATIONS

Notice to Submit Response, no date found.

(Continued)

*Primary Examiner*—Tianjie Chen
(74) *Attorney, Agent, or Firm*—Staas & Halsey LLP

(57) ABSTRACT

An actuator of a hard disk drive moves a magnetic head to record and reproduce data with respect to a disk to a predetermined position on the disk. The actuator includes a suspension supporting a slider where the magnetic head is mounted, and an arm included on a base plate of the hard disk drive to be capable of pivoting and having the suspension included at a leading end portion of the arm and a coil of a voice coil motor coupled to a rear end portion of the arm. The coil is coupled to the rear end portion of the arm by an outer mold formed to encompass an outer circumference of the coil, an inner mold formed inside the coil, and a connection mold connecting the outer mold and the inner mold is formed at least part of a surface of a non-effective portion of the coil except for an effective portion arranged to be perpendicular to a direction in which the arm pivots. Thus, a coupling force not only between the coil and the outer mold but also between the coil and the inner mold is increased so that a dynamic characteristic of the actuator is improved and a stable operation of the actuator is guaranteed.

23 Claims, 6 Drawing Sheets

U.S. PATENT DOCUMENTS

| | | | |
|---|---|---|---|
| 6,115,222 A * | 9/2000 | Andrews et al. | 360/265.1 |
| 6,252,746 B1 | 6/2001 | Cho | |
| 6,404,596 B1 | 6/2002 | McReynolds et al. | |
| 6,787,941 B2 * | 9/2004 | Takashima | 310/12 |
| 2002/0159196 A1 * | 10/2002 | Watanabe | 360/264.7 |

FOREIGN PATENT DOCUMENTS

| | | |
|---|---|---|
| JP | 2002-25832 | 1/2002 |

OTHER PUBLICATIONS

Korean Office Action, Issued Jun. 28, 2004.

* cited by examiner

ACTUATOR AND HARD DISK DRIVE EMPLOYING THE SAME

CROSS-REFERENCE TO RELATED APPLICATIONS

This application claims the priority of Korean Patent Application No. 2002-41586 filed Jul. 16, 2002 in the Korean Intellectual Property Office, the disclosure of which is incorporated herein in its entirety by reference.

BACKGROUND OF THE INVENTION

1. Field of the Invention

The present invention relates to a hard disk drive, and more particularly, to an actuator that moves a magnetic head to record and to reproduce data to a predetermined position on a disk, and a hard disk drive employing the same.

2. Description of the Related Art

Hard disk drives (HDDs) are auxiliary storage devices used with a computer. The hard disk drive reads out data stored on a magnetic disk or record data on the magnetic disk by using a magnetic head.

FIG. 1 is a perspective view illustrating a conventional hard disk drive. Referring to FIG. 1, the conventional hard disk drive includes a housing 10, a magnetic disk (hard disk) 20 that is a recording medium included in the housing 10, a spindle motor 30 included on a base plate 11 of the housing 10 to rotate the disk 20, and an actuator 40 having a magnetic head (not shown) to record and reproduce data.

The housing 10 is included inside a main body of a computer and includes the base plate 11 supporting the spindle motor 30 and the actuator 40 and a cover plate 12 coupled to the upper portion of the base plate 11 and encompassing and protecting the disk 20.

The disk 20 is a recording medium to record data and one or a plurality of disks are included in the computer and are to be separated a predetermined distance from each other and are capable of being rotated by the spindle motor 30. A parking zone 21 where a slider 42 where the magnetic head is mounted when the power is turned off is included at the inner circumferential side of the disk 20. A data zone 22 where data is stored is included outside the parking zone 21.

The actuator 40 includes an arm 46 included to pivot around a pivot shaft 47 included on the base plate 11, the slider 42, and a suspension 44 included at an end portion of the arm 46 and supporting the slider 42 to be elastically biased toward a surface of the disk 20. The arm 46 is rotated by a voice coil motor 50. A lower yoke 51 is fixedly included on the base plate 11. An upper yoke 52 is coupled above the lower yoke 51.

In the conventional hard disk drive having the above structure, during which data is being recorded/reproduced, a lifting force by the rotation of the disk 20 and an elastic force by the suspension 44 are applied to the slider 42. Accordingly, since the slider 42 is lifted and remains in a lifted state above the data zone 22 of the disk 20 at a height where the lifting force and the elastic force are balanced, the magnetic head mounted on the slider 42 maintains a predetermined distance from the disk 20 that is rotating to record or reproduce data with respect to the disk 20. When the power is turned off and the disk 20 stops rotating, since the lifting force lifting the slider 42 disappears, the slider 42 must be moved from the data zone 22 of the disk 20 in advance. That is, as the arm 46 of the actuator 40 is moved by the voice coil motor 50 so that the slider 42 is moved to the parking zone 21 of the disk 20 before the disk 20 stops rotating completely, even when the rotation of the disk 20 is stopped, the slider 42 is disposed in the parking zone 21 so that damage done to the data zone 22 is prevented. When the power is turned on and the disk 20 resumes rotating, the lifting force is generated again and accordingly the slider 42 is lifted. Then, the slider 42, while lifted, is moved to the data zone 22 of the disk 20 as the arm 46 is rotated by the voice coil motor 50. The magnetic head mounted on the slider 42 records or reproduces data with respect to the data zone 22 of the disk 20.

FIG. 2 shows a perspective view illustrating a conventional actuator. Referring to FIG. 2, the conventional actuator 40 includes the arm 46. A pivot hole 48 is formed in the middle of the arm 46 and the pivot shaft 47 shown in FIG. 1 is inserted into the pivot hole 48. The suspension 44 is included at an end portion of the arm 46 and supporting the slider 42 where a magnetic head 41 is mounted to be elastically biased toward a surface of the disk 20. A coil 56 of the voice coil motor 50 is coupled to the rear end portion of the arm 46. Magnets 53 and 54 of the voice coil motor 50 are included at lower and upper sides of the coil 56, respectively, to face each other with a predetermined interval therebetween. The magnets 53 and 54 are attached to the upper surface of the lower yoke 51 of FIG. 1 and the lower surface of the upper yoke 52 of FIG. 1, respectively.

The coil 56 is coupled to the arm 46 by a plastic injection molding. That is, plastic resin is injection molded to form an outer mold 49a outside the coil 56 and an inner mold 49b inside the coil 56. Accordingly, the coil 56 is fixedly coupled to the rear end portion of the arm 46 by coupling forces between the outer circumferential surface of the coil 56 and the outer mold 49a, and the inner circumferential surface of the coil 56 and the inner mold 49b.

The actuator 40 having the above structure is controlled by a servo control system and moved in a direction according to the Fleming's left hand rule by the interaction between current applied to the coil 56 and the magnetic field generated by the magnets 53 and 54. Here, the rotation direction of the actuator 40 changes rapidly according to the direction of the current applied to the coil 56 by the servo control system. The movement speed of the magnetic head 41 is an important factor in determining seek time of a hard disk drive. Thus, it is advantageous to generate a strong force (torque).

During the operation of the hard disk drive, the actuator 40 repeatedly changes a pivot direction instantly to move the magnetic head 41 to a desired place. Such movements generate vibrations having a variety of frequencies and amplitudes in the actuator 40 and the vibrations cause the magnetic head 41 to vibrate. When the magnetic head 41 vibrates, a position error signal (PES) increases which will impede the read/write function of the magnetic head 41 along a track formed on the disk. Thus, since the performance of the hard disk drive can be improved by minimizing the vibrations, the dynamic characteristic of the respective part of the actuator 40 should be optimally designed and the parts should be firmly coupled to one another.

However, in the conventional actuator 40, in the process of plastic injection molding to couple the coil 56 to the rear end portion of the arm 46, the coupling force between the inner mold 49b and the coil 56 can be deteriorated due to contraction of the inner mold 49b. More particularly, as plastic resin is cooled, the plastic resin contracts so that the coupling force between the outer mold 49a and the coil 56 increases while the coupling force between the inner mold 49b and the coil 56 decreases. In this state, when vibrations are generated in the actuator 40, the inner mold 49b and the coil 56 may be partially separated. Accordingly, the dynamic characteristic of the system deteriorates and the vibration of the actuator 40 increases, thus the performance of the magnetic head 41 deteriorates. Also, if the coupling state between the coil 56 and the arm 46 is inferior, the resonance frequency of the actuator 40 is lowered. Accordingly, when the resonance frequency is lowered and deviated from a range in which the servo control system can control, the normal operation of the actuator 40 is not possible.

FIG. 3 is a graph showing the amplitude of a magnetic head portion according to the frequency in the conventional actuator. Referring to the graph of FIG. 3, a peak value of the amplitude is high in a high frequency area A. As shown in the graph of FIG. 3, if the coupling state between the coil and the arm is inferior, the dynamic characteristic of the system is deteriorated which will degrade the quality of a product. Furthermore, when the deviation in the quality of mass produced products increases, consistent quality of the products cannot be expected.

SUMMARY OF THE INVENTION

Accordingly, the present invention provides an actuator in which a connection mold that connects the outer mold and the inner mold with respect to the coil is formed to increase the coupling force between the arm and the coil of the actuator so that a dynamic characteristic of the actuator is improved.

According to an aspect of the present invention, an actuator of a hard disk drive moves a magnetic head to record and reproduce data with respect to a disk to a predetermined position on the disk. The actuator comprises a suspension supporting a slider where the magnetic head is mounted, and an arm included on a base plate of the hard disk drive to be capable of pivoting and having the suspension included at a leading end portion of the arm and a coil of a voice coil motor coupled to a rear end portion of the arm. The coil is coupled to the rear end portion of the arm by an outer mold formed to encompass an outer circumference of the coil, an inner mold formed inside the coil, and a connection mold connecting the outer mold and the inner mold is formed at least part of a surface of a non-effective portion of the coil except for an effective portion arranged to be perpendicular to a direction in which the arm pivots.

In an aspect of the present intent, the connection mold is formed at an entire surface of the non-effective portion of the coil.

In an aspect of the present intent, the connection mold is formed in a middle portion along a lengthwise direction of the non-effective portion of the coil.

In an aspect of the present intent, the connection mold is formed at at least two positions with a predetermined interval along a lengthwise direction of the non-effective portion of the coil.

In an aspect of the present intent, the connection mold is formed on an upper surface and a lower surface of the non-effective portion of the coil.

A hard disk drive to reproduce data stored in a disk or records data on the disk by using a magnetic head. The hard disk drive comprises an actuator including an arm included on a base plate of the hard disk drive to be capable of pivoting and a suspension included at a leading end portion of the arm and supporting a slider on which the magnetic head is mounted, and a voice coil motor including a coil coupled to a rear end portion of the arm and a magnet arranged to be separated a predetermined distance from the coil and to face at least one of upper and lower surfaces of the coil, and pivoting the actuator in a predetermined direction by the interaction between current flowing through the coil and a magnetic field formed by the magnet. The coil is coupled to the rear end portion of the arm by an outer mold formed to encompass an outer circumference of the coil, an inner mold formed inside the coil, and a connection mold connecting the outer mold and the inner mold is formed at least part of a surface of a non-effective portion of the coil except for an effective portion arranged to be perpendicular to a direction in which the arm pivots and to face the magnet.

Additional and/or other aspects and advantages of the invention will be set forth in part in the description which follows and, in part, will be obvious from the description, or may be learned by practice of the invention.

BRIEF DESCRIPTION OF THE DRAWINGS

These and other aspects and advantages of the invention will become apparent and more readily appreciated from the following description of the preferred embodiments taken in conjunction with the accompanying drawings in which.

DETAILED DESCRIPTION OF THE PREFERRED EMBODIMENTS

Figure 1:
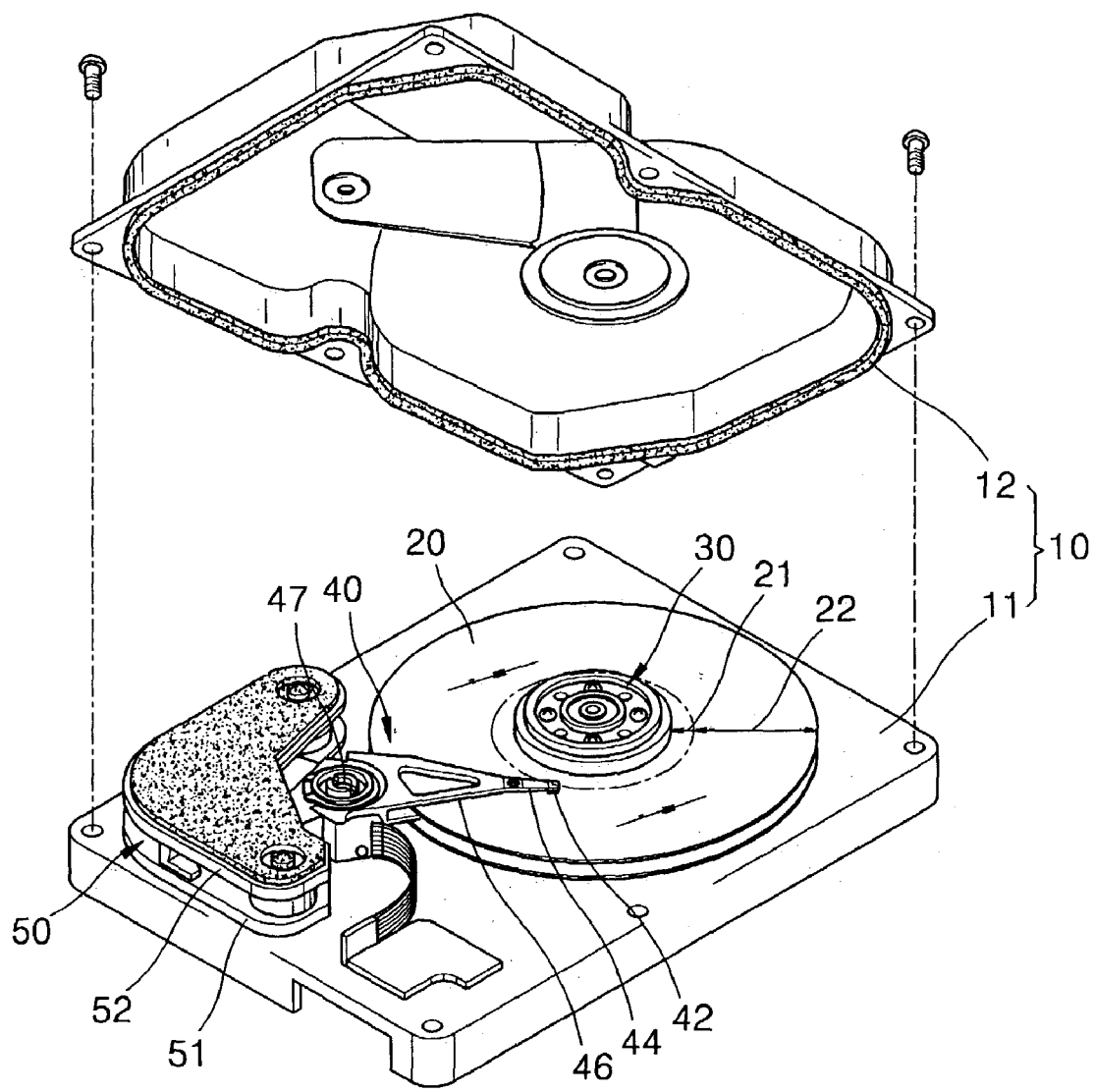
FIG. 1 is a perspective view illustrating the conventional hard disk drive.
Figure 2:
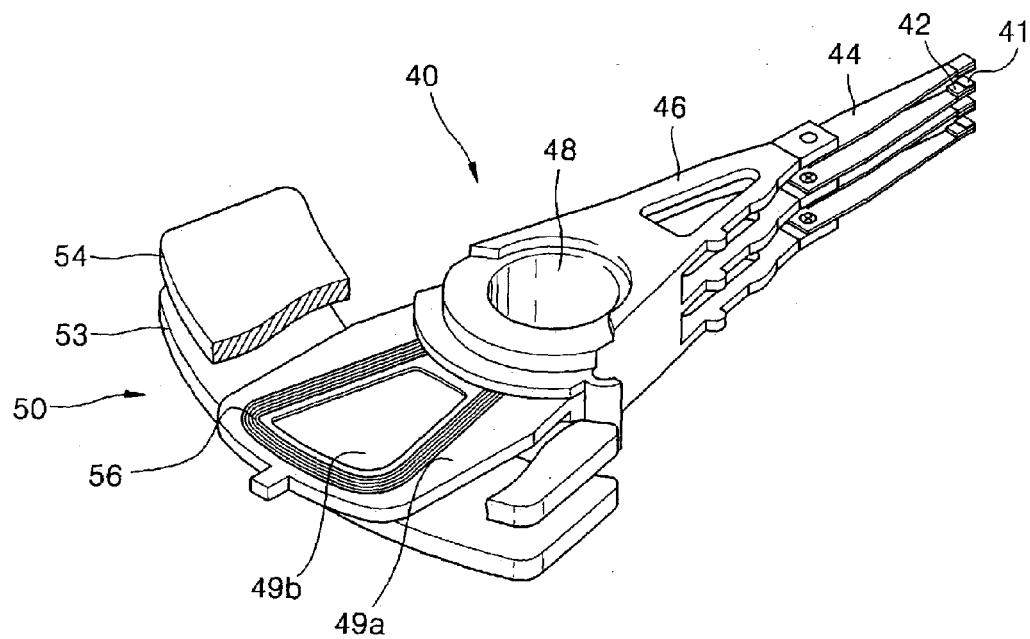
FIG. 2 is a perspective view illustrating the conventional actuator.

Reference will now be made in detail to the present preferred embodiments of the present invention, examples of which are illustrated in the accompanying drawings, wherein like reference numerals refer to the like elements throughout. The embodiments are described below in order to explain the present invention by referring to the figures.

Figure 4:
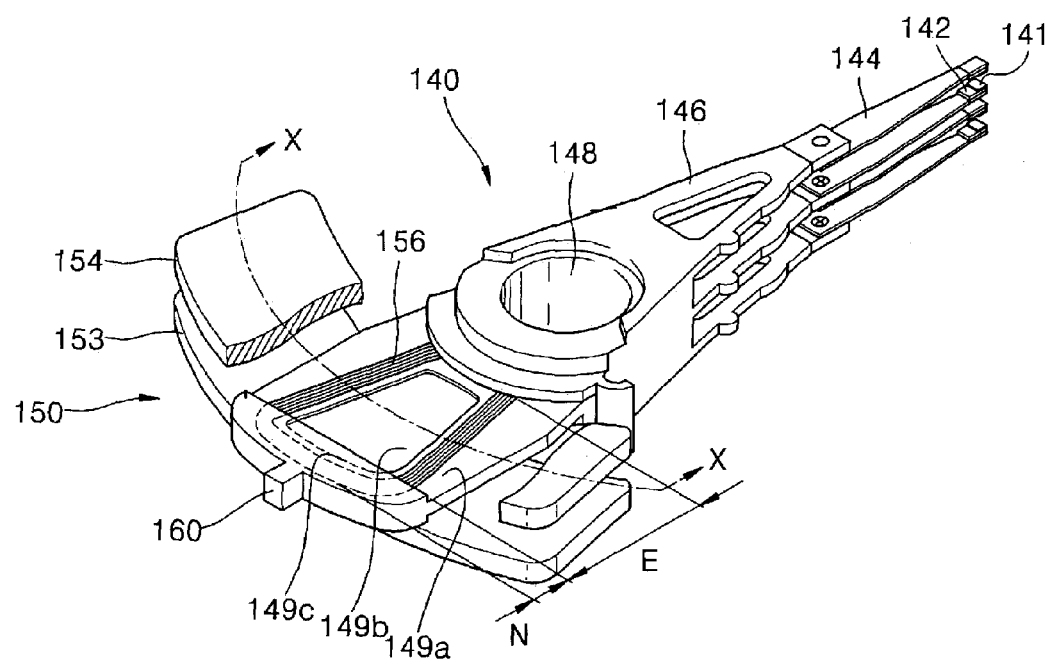
FIG. 4 is a perspective view illustrating an actuator of a hard disk drive according to a first preferred embodiment of the present invention.
Figure 5:
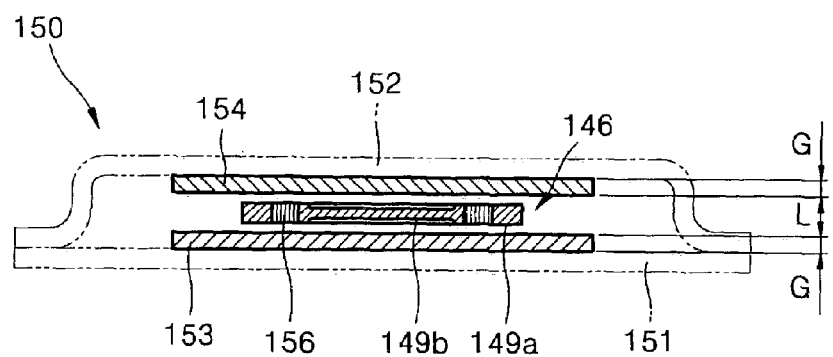
FIG. 5 is a sectional view of a voice coil motor portion taken along line X-X of FIG. 4.

Referring to FIGS. 4 and 5, an actuator 140 of a hard disk drive according to the present invention moves a magnetic head 141 to record and reproduce data with respect to a disk to a predetermined position on the disk. The actuator 140 includes an arm 146 which is included on the base plate of a hard disk drive to pivot. A pivot hole 148 is formed in the middle portion of the arm 146. A suspension 144 supporting a slider 142 on which the magnetic head 141 is mounted to be elastically biased toward a surface of the disk is included at an end portion of the arm 146.

A voice coil motor 150 that pivots the arm 146. The voice coil motor 150 includes a coil 156 coupled to a rear end portion of the arm 146 and magnets 153 and 154 arranged to be separated a predetermined distance from the coil 156 and to face the lower surface and the upper surface of the coil 156.

In an embodiment, permanent magnets are mainly used as the magnets 153 and 154. As shown in FIG. 5, the magnets 153 and 154 are attached to the upper surface of the lower yoke 151 fixedly on the base plate of the hard disk drive and the lower surface of the upper yoke 152 coupled to the lower yoke 151, respectively.

The coil 156 is coupled to the arm 146 by plastic injection molding. More particularly, the coil 156 is coupled to the rear end portion of the arm 146 by an outer mold 149a formed to encompass the outer circumference of the coil 156 and an inner mold 149b formed inside the coil 156. The outer mold 149a and the inner mold 149b are connected by a connection mold 149c which is a characteristic feature of the present invention. The outer mold 149a, the inner mold 149b, and the connection mold 149c are simultaneously formed by plastic resin injection molding after the coil 156 is arranged in a mold.

The coil 156 can be divided into an effective portion E which is a portion facing the magnets 153 and 154, and a non-effective portion N which is a portion other than the effective portion E. The effective portion E is arranged in a direction perpendicular to a direction in which the arm 146 pivots. The non-effective portion N is arranged in a direction parallel to the direction in which the arm 146 pivots. According to the Fleming's left hand rule, the direction of torque applied to the arm 146 is perpendicular to a direction of current flowing through the coil 156. Accordingly, the current flowing through the effective portion E of the coil 156 flows in a direction perpendicular to the direction in which the arm 146 pivots. Thus, torque pivoting the arm 146 in a direction perpendicular to the direction of current can be generated. However, since the current flowing through the non-effective portion N of the coil 156 flows in the direction parallel to the direction in which the arm 146 pivots, the current cannot generate torque in the direction in which the arm 146 pivots. Accordingly, the effective portion E of the coil 156 is arranged between the magnets 153 and 154 and the non-effective magnet N is arranged at a position deviating from the position of the magnets 153 and 154.

The torque applied to the arm 146 is inversely proportional to a distance L between the magnets 153 and 154 and proportional to a thickness G of the respective magnets 153 and 154 (torque∝G/L). Thus, to generate a stronger torque, the distance L between the magnets. 153 and 154 should be as short as possible within the limit of not disturbing the pivot of the arm 146. However, when the connection mold 149c is formed on the surface of the effective portion E of the coil 156, since the above distance L needs to be increased to fit to a thickness of the connection mold 149c, the torque decreases accordingly.

As a result, the connection mold 149c is formed only on the surface of the non-effective portion N and not on the effective portion E of the coil 156. In particular, as shown in FIG. 4, the connection mold 149c is formed on the entire surface of the non-effective portion N of the coil 156. Although the connection mold 149c can be formed on any of the upper and lower surfaces of the non-effective portion C of the coil 156, the connection mold 149c is preferably formed on both the upper and lower surfaces as shown in the drawing.

The connection mold 149c connects the outer mold 149a and the inner mold 149b so as to increase a coupling force between the coil 156 and the inner mold 149b. More particularly, the plastic resin injected in the plastic resin injection molding to couple the coil 156 to the rear end portion of the arm 146 is contracted while being cooled. Here, as the outer mold 149a is contracted, the coupling force between the coil 156 and the outer mold 149a increases. Since the inner mold 149b is connected to the outer mold 149a through the connection mold 149c, as the connection mold 149c is contracted, the inner mold 149b is pulled toward the non-effective portion N of the coil 156. Thus, the non-effective portion N of the coil 156 is completely encompassed by the outer mold 149a, the inner mold 149b, and the connection mold 149c in a closely contacting state.

As described above, since the coupling force between the inner mold 149b and the coil 156 is increased by the connection mold 149c, the conventional problem that the inner mold 149b and the coil 156 are separated by vibrations or impacts can be solved.

Figure 3:
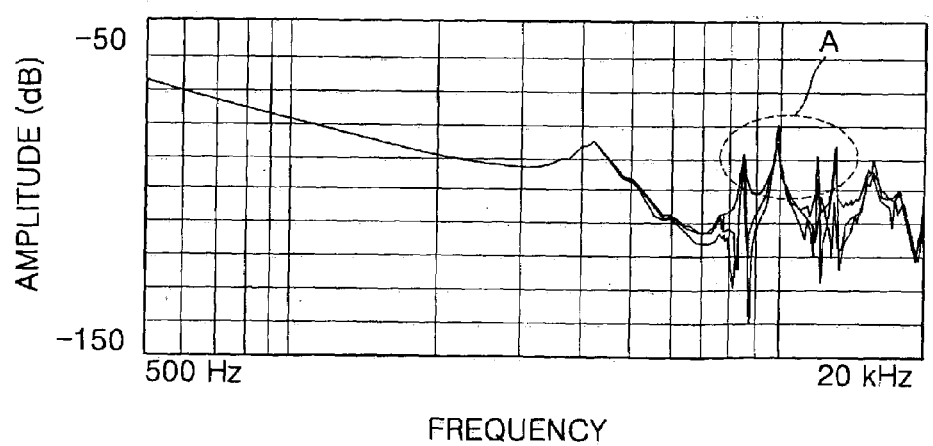
FIG. 3 is a graph showing the amplitude of the magnetic head portion according to the frequency in the conventional actuator.
Figure 8:
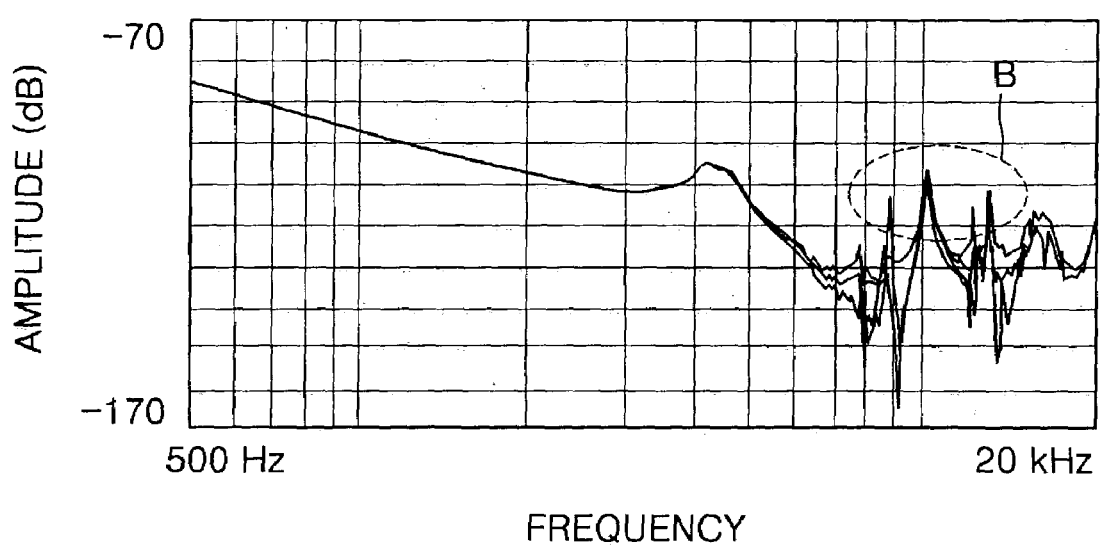
FIG. 8 is a graph showing the amplitude of the magnetic head portion according to the frequency according to the present invention.

FIG. 8 is a graph showing the amplitude of the magnetic head portion according to the frequency in the actuator according to the present invention. In the graph of FIG. 8, it can be seen that a peak value of the amplitude in a high frequency area B is lower than the graph of FIG. 3. Accordingly, as the coupling force between the coil and the arm increases, the resonance frequency of the system increases and the dynamic characteristic is improved. Thus, the position error signal PES decreases and the magnetic head 141 can operate stably so that the performance of the hard disk drive is improved.

In FIGS. 4 and 5, although the magnets 153 and 154 are shown to be included at the upper and lower portions of the coil 156 to face the upper and lower surfaces of the coil 156, the magnets 153 and 154 can be included any one of the upper and lower portions of the coil 156. A latch 160 prevents a pivot of the actuator 140 when the power of the hard disk drive is turned off.

Figure 6:
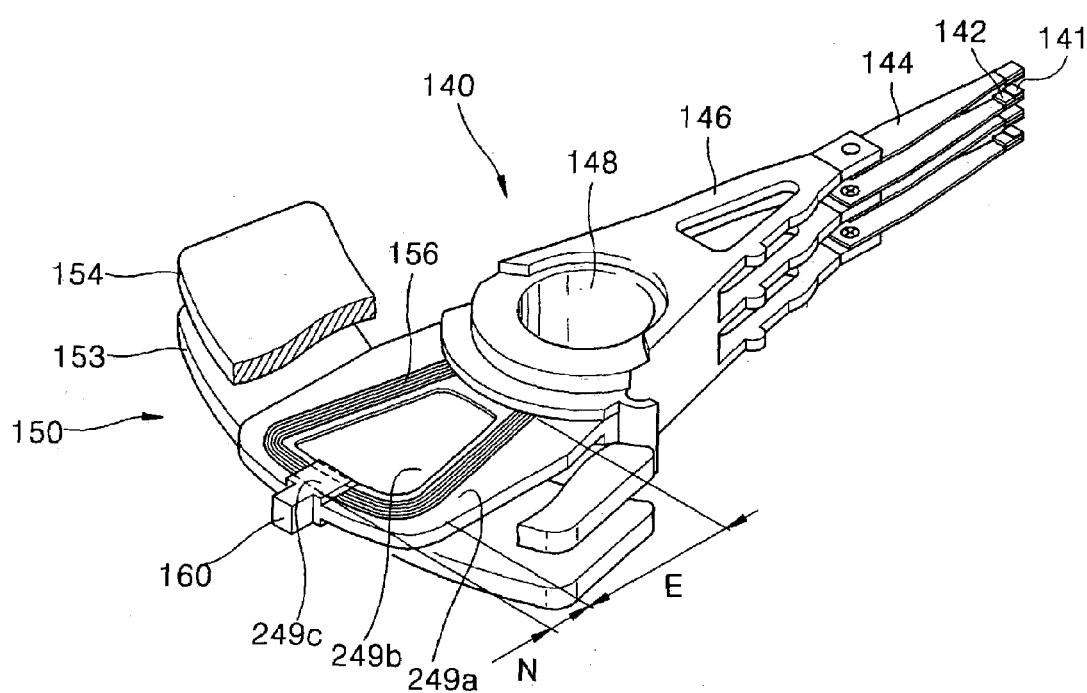
FIG. 6 is a perspective view illustrating an actuator of a hard disk drive according to a second preferred embodiment of the present invention.
Figure 7:
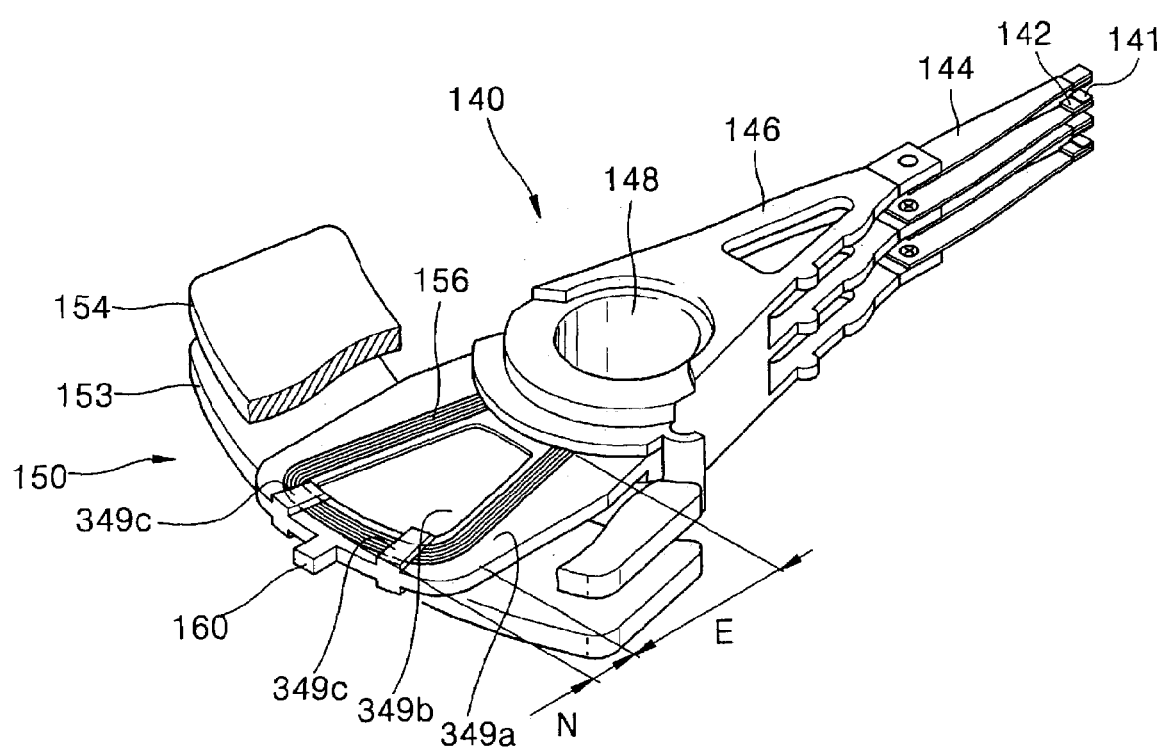
FIG. 7 is a perspective view illustrating an actuator of a hard disk drive according to a third preferred embodiment of the present invention.

FIG. 6 is a perspective view illustrating an actuator of a hard disk drive according to a second preferred embodiment of the present invention. FIG. 7 is a perspective view illustrating an actuator of a hard disk drive according to a third preferred embodiment of the present invention. In FIGS. 6 and 7, the same reference numerals as those in FIG. 4 indicate the same elements.

Referring to FIG. 6, a connection mold 249c can be formed at the only one position in the middle of the lengthwise direction of the non-effective portion N. Preferably, the connection mold 249c is formed both at the upper surface and the lower surface of the non-effective portion N of the coil 156. The connection mold 249c connects an outer mold 249a and an inner mold 249b, as shown in the above-described embodiment, so that a coupling force between the inner mold 249b and the coil 156 increases. Thus, in the present preferred embodiment, the same effect as in the above-described embodiment can be obtained.

Referring to FIG. 7, a connection mold 349c formed at at least two positions with a predetermined interval therebetween along a lengthwise direction of the non-effective portion N of the coil 156. Two or three connection molds are appropriate considering the length of the non-effective portion N of the coil 156. The connection mold 349c is preferably formed both on the upper and lower surfaces of the non-effective portion N of the coil 156. According to the present preferred embodiment, since the connection mold 349c connects an outer mold 349a and an inner mold 349b at at least two positions, a coupling force between the inner mold 349b and the coil 156 increases than that in the above-described second preferred embodiment.

As described above, according to the present invention, not only the coupling force between the coil and the outer mold but also the coupling force between the coil and the inner mold is increased by the connection mold formed on the surface of the non-effective portion of the coil. Thus, the resonance frequency of the actuator increases and the dynamic characteristic is improved, so that a stable operation of the actuator is guaranteed. Furthermore, the position error signal decreases and the magnetic head can operate stably, so that the performance of the hard disk drive is improved.

Although a few preferred embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An actuator of a hard disk drive, having a base plate and a voice coil motor, to move a magnetic head to record and reproduce data with respect to a disk to a predetermined position on the disk, comprising:

a suspension supporting a slider where the magnetic head is mounted;

an arm included on the base plate of the hard disk drive to pivot, the arm including the suspension at a leading end portion of the arm and a coil of the voice coil motor coupled to a rear end portion of the arm; and a set of magnets arranged to be separated a predetermined distance from the coil, wherein an area between the magnets is an area of the coil having an effective portion and an area outside of the magnets is an area of the coil having a non-effective portion and, the coil is coupled to the rear end portion of the arm by an outer mold formed to encompass an outer circumference of the coil, an inner mold is formed inside the coil, and a connection mold connecting the outer mold and the inner mold is formed on at least part of a surface of the area of the coil having the non-effective portion and not on the area of the coil having the effective portion, wherein the connection mold is only formed on the outer circumference of the coil on a distal end relative to a pivot hole of the arm.

2. The actuator as claimed in claim 1, wherein the connection mold is formed at an entire surface of the area of the coil having the non-effective portion.

3. The actuator as claimed in claim 1, wherein the connection mold is formed in a middle portion along a lengthwise direction of the area of the coil having the non-effective portion.

4. The actuator as claimed in claim 1, wherein the connection mold is formed at at least two positions along a lengthwise direction of the area of the coil having the non-effective portion.

5. An actuator of a hard disk drive, having a base plate and a voice coil motor, to move a magnetic head to record and reproduce data with respect to a disk to a predetermined position on the disk, comprising:

a suspension supporting a slider where the magnetic head is mounted; and an arm included on the base plate of the hard disk drive to pivot, the arm including the suspension at a leading end portion of the arm and a coil of the voice coil motor coupled to a rear end portion of the arm; and a set of magnets arranged to be separated a predetermined distance from the coil, wherein an area between the magnets is an area of the coil having an effective portion and an area outside of the magnets is an area of the coil having a non-effective portion, the coil is coupled to the rear end portion of the arm by an outer mold formed to encompass an outer circumference of the coil, an inner mold is formed inside the coil, and a connection mold connecting the outer mold and the inner mold is formed at least part of a surface of the area of the coil having the non-effective portion and not on the area of the coil having the effective portion and, the connection mold is formed on an upper surface and a lower surface of the area of the coil having the non-effective portion, wherein the connection mold is only formed on the outer circumference of the coil on a distal end relative to a pivot hole of the arm.

6. A hard disk drive that reproduces data stored in a disk or records data on the disk by using a magnetic head, the hard disk drive comprising:

an actuator including an arm included on a base plate of the hard disk drive to pivot and a suspension at a leading end portion of the arm and supporting a slider on which the magnetic head is mounted; and a voice coil motor including a coil coupled to a rear end portion of the arm and a magnet arranged to be separated a predetermined distance from the coil and to face at least one of upper and lower surfaces of the coil, and pivoting the actuator in a predetermined direction by the interaction between current flowing through the coil and a magnetic field formed by the magnet; and a set of magnets arranged to be separated a predetermined distance from the coil, wherein an area between the magnets is an area of the coil having an effective portion and an area outside of the magnets is an area of the coil having a non-effective portion and, the coil is coupled to the rear end portion of the arm by an outer mold formed to encompass an outer circumference of the coil, an inner mold is formed inside the coil, and a connection mold connecting the outer mold and the inner mold is formed on at least part of a surface of the area of the coil having the non-effective portion and not on the area of the coil having the effective portion, wherein the connection mold is only formed on the outer circumference of the coil on a distal end relative to a pivot hole of the arm.

7. The actuator as claimed in claim 6, wherein the connection mold is formed at an entire surface of the area of the coil having the non-effective portion.

8. The actuator as claimed in claim 6, wherein the connection mold is formed in a middle portion along a lengthwise direction of the area of the coil having the non-effective portion.

9. The actuator as claimed in claim 6, wherein the connection mold is formed at at least two positions along a lengthwise direction of the area of the coil having the non-effective portion.

10. A hard disk drive that reproduces data stored in a disk or records data on the disk by using a magnetic head, the hard disk drive comprising:

an actuator including an arm included on a base plate of the hard disk drive to pivot and a suspension at a leading end portion of the arm and supporting a slider on which the magnetic head is mounted;

a voice coil motor including a coil coupled to a rear end portion of the arm and a magnet arranged to be separated a predetermined distance from the coil and to face at least one of upper and lower surfaces of the coil, and pivoting the actuator in a predetermined direction by the interaction between current flowing through the coil and a magnetic field formed by the magnet; and a set of magnets arranged to be separated a predetermined distance from the coil, wherein an area between the magnets is an area of the coil having an effective portion and an area outside of the magnets is an area of the coil having a non-effective portion, the coil is coupled to the rear end portion of the arm by an outer mold formed to encompass an outer circumference of the coil, an inner mold is formed inside the coil, and a connection mold connecting the outer mold and the inner mold is formed on at least part of a surface of the area of the coil having the non-effective portion and not on the area of the coil having the effective portion, the connection mold is formed on an upper surface and a lower surface of the area of the coil having the non-effective portion, and is only formed on the outer circumference of the coil on a distal end relative to a pivot hole of the arm.

11. A suspended actuator of a hard disk drive, having a base plate, that moves a magnetic head to record and reproduce data on a disk to a predetermined position on the disk, comprising:

a coil;

a pivoting arm on the base plate of the hard disk drive; and magnets positioned above and below a part of an area of the coil having an effective portion during operation of the suspended actuator, wherein the coil, including the area of the coil having the effective portion and an area of the coil having a non-effective portion outside of the area of the coil having the effective portion of the magnets, carrying current in two directions and coupled to the pivoting arm by an outer mold encompassing an outer circumference of the coil, an inner mold inside the coil, and a connection mold, connecting the outer and inner molds, at a surface of the area of the coil having the non-effective portion and not at a surface of the area of the coil having the effective portion, wherein the connection mold is only formed on the outer circumference of the coil on a distal end relative to a pivot hole of the arm.

12. The actuator as claimed in claim 11, wherein the connection mold is at an entire surface of the area of the coil having the non-effective portion.

13. The actuator as claimed in claim 11, wherein the connection mold is formed in a middle portion along a lengthwise direction of the area of the coil having the non-effective portion.

14. The actuator as claimed in claim 11, wherein the connection mold is formed at at least two positions along a lengthwise direction of the area of the coil having the non-effective portion.

15. A suspended actuator of a hard disk drive, having a base plate, that moves a magnetic head to record and reproduce data on a disk to a predetermined position on the disk, comprising:

a coil;

a pivoting arm on the base plate of the hard disk drive; and magnets normally above and below a part of an area of the coil having an effective portion during operation of the suspended actuator, wherein the coil, including the area of the coil having the effective portion running perpendicular to a pivoting direction and an area of the coil having a non-effective portion running parallel to the pivoting direction, carrying current in two directions and coupled to the pivoting arm by an outer mold encompassing an outer circumference of the coil, an inner mold inside the coil, and a connection mold, connecting the outer and inner molds, at a surface of the area of the coil having the non-effective portion and not at a surface of the area of the coil having the effective portion, wherein the connection mold is only formed on the outer circumference of the coil on a distal end relative to a pivot hole of the arm.

16. A hard disk drive, having a base plate, to reproduce data stored in a disk or record data on a disk by using a magnetic head, the hard disk drive comprising:

a coil;

an actuator including a suspended pivoting arm on the base plate of the hard disk drive supporting a slider on which the magnetic head is mounted; and magnets normally above and below a part of an area of the coil having an effective portion during operation of the suspended actuator, wherein the coil, including the area of the coil having the effective portion running perpendicular to a pivoting direction and an area of the coil having a non-effective portion running parallel to the pivoting direction, carrying current in two directions and coupled to the pivoting arm by an outer mold encompassing an outer circumference of the coil, an inner mold inside the coil, and a connection mold, connecting the outer and inner molds, at a surface of the area of the coil having the non-effective portion and not at a surface of the area of the coil having the effective portion, wherein the connection mold is only formed on the outer circumference of the coil on a distal end relative to a pivot hole of the arm.

17. The actuator as claimed in claim 16, wherein the connection mold is at an entire surface of the area of the coil having the non-effective portion.

18. The actuator as claimed in claim 16, wherein the connection mold is formed in a middle portion along a lengthwise direction of the area of the coil having the non-effective portion.

19. The actuator as claimed in claim 16, wherein the connection mold is formed at at least two positions along a lengthwise direction of the area of the coil having the non-effective portion.

20. A hard disk drive, having a base plate, to reproduce data stored in a disk or record data on a disk by using a magnetic head, the hard disk drive comprising:

a coil;

an actuator including a suspended pivoting arm on the base plate of the hard disk drive supporting a slider on which the magnetic head is mounted; and magnets normally above and below a part of an area of the coil having an effective portion during operation of the suspended actuator, wherein the coil, including the area of the coil having the effective portion and an area of the coil having a non-effective portion outside of the area of the coil having the effective portion and coupled to the pivoting arm by an outer mold encompassing an outer circumference of the coil, an inner mold inside the coil, and a connection mold, connecting the outer and inner molds, at a surface of the area of the coil having the non-effective portion and not at a surface of the area of the coil having the effective portion, wherein the connection mold is only formed on the outer circumference of the coil on a distal end relative to a pivot hole of the arm.

21. A subassembly of a hard disk drive, comprising:

a voice coil motor including a coil that has an upper and lower surface with an area of the coil having a non-effective portion;

a set of magnets arranged to be separated a predetermined distance from the coil mounted on a pivoting arm, wherein an area between the magnets is an area of the coil having an effective portion and an area outside of the magnets is the area of the coil having the non-effective portion; and an inner mold is formed inside said coil;

an outer mold is formed on an outer circumference of said coil; and a connection mold connecting said outer mold and said inner mold wherein the connection mold is formed both on said upper and said lower surface of the area of the coil having the non-effective portion and not on the area of the coil having the effective portion on a distal end relative to a pivot hole of the arm.

22. An actuator assembly of a hard disk drive, comprising:

an arm, comprising:

a voice coil;

magnets positioned above and below a part of an area of the voice coil having an effective portion and an area outside of the magnets is an area of the voice coil having a non-effective portion;

an outer mold holding the voice coil on an outside;

an inner mold holding the voice coil on an inside; and a connection mold connecting the inner mold and the outer mold across the voice coil and is formed on at least part of a surface of the area of the voice coil having the non-effective portion and not on the area of the voice coil having the effective portion, wherein the connection mold is only formed on an outer circumference of the voice coil on a distal end relative to a pivot hole of the arm.

23. An actuator assembly as claimed in claim 22, wherein the arm has a pivot, the voice coil has a side away from the pivot and the connection mold is located on the side away from the pivot.

* * * * *